United States Patent
Hodess et al.

(10) Patent No.: US 6,951,279 B2
(45) Date of Patent: Oct. 4, 2005

(54) SYSTEM AND APPARATUS FOR PROTECTING DIGITAL MEDIA

(75) Inventors: David Hodess, Los Angeles, CA (US); Jung Suh, Santa Monica, CA (US); Sean E. Spector, Sherman Oaks, CA (US)

(73) Assignee: Gamefly, Inc., Santa Monica, CA (US)

(*) Notice: Subject to any disclaimer, the term of this patent is extended or adjusted under 35 U.S.C. 154(b) by 0 days.

(21) Appl. No.: 10/681,077

(22) Filed: Oct. 7, 2003

(65) Prior Publication Data

US 2005/0072694 A1 Apr. 7, 2005

(51) Int. Cl.[7] .............................................. B65D 85/57
(52) U.S. Cl. ....................... 206/313; 229/305; 229/306; 229/313
(58) Field of Search ....................... 206/308.1, 309–313, 206/232, 307; 229/307, 313, 314, 300–302, 305, 306

(56) References Cited

U.S. PATENT DOCUMENTS

| | | | | |
|---|---|---|---|---|
| 2,777,574 A | * | 1/1957 | Brody | 206/313 |
| 2,894,676 A | * | 7/1959 | Lindeke | 229/300 |
| 3,774,757 A | * | 11/1973 | Harris et al. | 206/313 |
| 4,042,106 A | * | 8/1977 | Smith | 206/313 |
| 4,327,830 A | * | 5/1982 | Patel et al. | 206/312 |
| 4,339,034 A | * | 7/1982 | Panveno | 206/313 |
| 4,473,153 A | * | 9/1984 | Colangelo | 206/312 |
| 4,762,225 A | | 8/1988 | Henkel | |
| 4,811,995 A | | 3/1989 | Ackeret | |
| 5,011,010 A | | 4/1991 | Francis et al. | |
| 5,048,681 A | * | 9/1991 | Henkel | 206/313 |
| 5,147,036 A | * | 9/1992 | Jacobs | 206/313 |
| 5,207,373 A | * | 5/1993 | Tighe | 229/305 |
| 5,235,822 A | | 8/1993 | Leonovich, Jr. | |
| 5,318,222 A | * | 6/1994 | Bartlett | 229/313 |
| 5,427,236 A | | 6/1995 | Kramer | |
| 5,462,158 A | | 10/1995 | Kramer | |
| 5,503,328 A | * | 4/1996 | Roccaforte et al. | 229/313 |
| D377,274 S | | 1/1997 | Spano | |
| 5,595,798 A | | 1/1997 | Miller | |
| 6,032,854 A | * | 3/2000 | Greer et al. | 229/313 |
| 6,126,201 A | | 10/2000 | Pace et al. | |
| 6,220,504 B1 | | 4/2001 | Flynn et al. | |
| 6,220,505 B1 | | 4/2001 | Flynn et al. | |
| 6,279,817 B1 | | 8/2001 | Flynn et al. | |
| 6,352,198 B1 | | 3/2002 | Flynn et al. | |
| 6,357,651 B1 | | 3/2002 | Flynn et al. | |
| 6,364,198 B1 | | 4/2002 | Flynn et al. | |
| 6,367,689 B1 | | 4/2002 | Flynn et al. | |
| 6,375,065 B1 | | 4/2002 | Flynn et al. | |
| 6,415,976 B1 | | 7/2002 | Flynn et al. | |
| 6,425,519 B1 | | 7/2002 | Flynn et al. | |
| 6,427,905 B1 | | 8/2002 | Flynn et al. | |
| 6,523,737 B1 | | 2/2003 | Flynn et al. | |
| 6,564,994 B2 | * | 5/2003 | Makofsky et al. | 229/313 |
| 2002/0084200 A1 | | 7/2002 | Bergh et al. | |
| 2003/0000854 A1 | | 1/2003 | Jang | |
| 2003/0049397 A1 | | 3/2003 | Singer et al. | |
| 2003/0054125 A1 | | 3/2003 | Singer et al. | |

* cited by examiner

Primary Examiner—Luan K. Bui
(74) Attorney, Agent, or Firm—Morrison & Foerster LLP

(57) ABSTRACT

The present invention is directed to a packaging system and apparatus for transporting digital media, such as DVDs or compact discs. In accordance with a preferred embodiment of the present invention, the packaging system includes an inner pocket made of high-density polyethylene fiber material for retaining digital media such as DVDs or compact discs, a protective jacket made of reinforced material such as cardboard into which the inner pocket may be inserted, a light-weight envelope with an opening into which the protective jacket and the inner pocket containing the digital media may be inserted, where the envelope has a detachable lid for sealing the envelope.

14 Claims, 4 Drawing Sheets

SYSTEM AND APPARATUS FOR PROTECTING DIGITAL MEDIA

BACKGROUND OF THE INVENTION

1. Field of the Invention

The present invention is directed to a system and apparatus for protecting digital media such as compact discs or DVDs so as to provide protection of the digital media during physical transport of the same.

2. Description of the Related Art

The Internet has popularized the purchase and rental of digital media via mail. Rather than purchasing or renting DVDs or video game discs (e.g., Xbox, Play Station, or Game Cube games) from traditional rental stores, many consumers are using the Internet to select and rent or purchase digital media, which are typically delivered to the consumer via U.S. mail or via any number of the commercial mail carriers. The ability to rent or purchase digital media over the Internet eliminates the need to visit traditional stores, and in many instances allow the consumer to select from a greater selection of available digital media.

Because digital media such as DVDs or compact discs are relatively thin and can be damaged from excessive bending or mangling, and because fragile items can be subject to a variety of damage causing conditions during mail transport, it is necessary to protect the digital media during transport in order to prevent damage to the digital media. One conventional method of mailing digital media is to simply use the manufacture's original protective packaging, such as the original compact disc or DVD casing. However, due to their relatively large size and heavy weight, it can be expensive to mail the digital media in their manufacturer original packaging.

Another method of transporting digital media via mail is to use thick cardboard like envelops so as to provide rigid support to the digital media contained therein. Because thick cardboard envelope are heavier than regular envelope, they are more expensive to acquire and to mail.

The present invention aims to overcome the disadvantages of the above-discussed methods by providing a system of protection for digital media during mail transport while keeping the cost of transporting the digital media to a minimal level.

SUMMARY OF THE INVENTION

The present invention provides a system of protection for transporting digital media through commercial carrier services such as the U.S. mail service. It is an objective of the present invention to provide protection to digital media during mail transport so as to prevent the digital media from being damaged during transport. It is another objective of the present invention to reduce the cost of transporting digital media.

To accomplish the above-mentioned objectives, the present invention is directed to a system of digital media transportation that includes a transportation package 10 with a body envelope 13 and a lid 11, wherein the digital media 16 to be transported is inserted into an inner pocket 15, which is in turn inserted into a protective jacket 12, which is in turn inserted into the body envelope 13. The transportation package 10 provides the consumer of the digital media to return the digital media to the original sender by simply re-using the inner pocket 15, the protective jacket 12, and the body envelope 13.

DETAILED DESCRIPTION OF THE PREFERRED EMBODIMENTS

The details of the preferred embodiments of the present invention will now be described with references to FIGS. 1–7.

Figure 1:
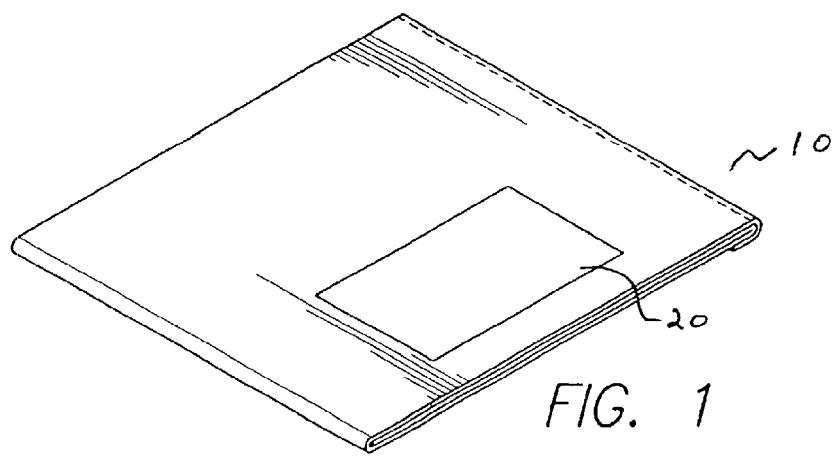
FIG. 1 is an illustration of a packaging system for protecting and transporting digital media in accordance with the preferred embodiment of the present invention.
Figure 2:
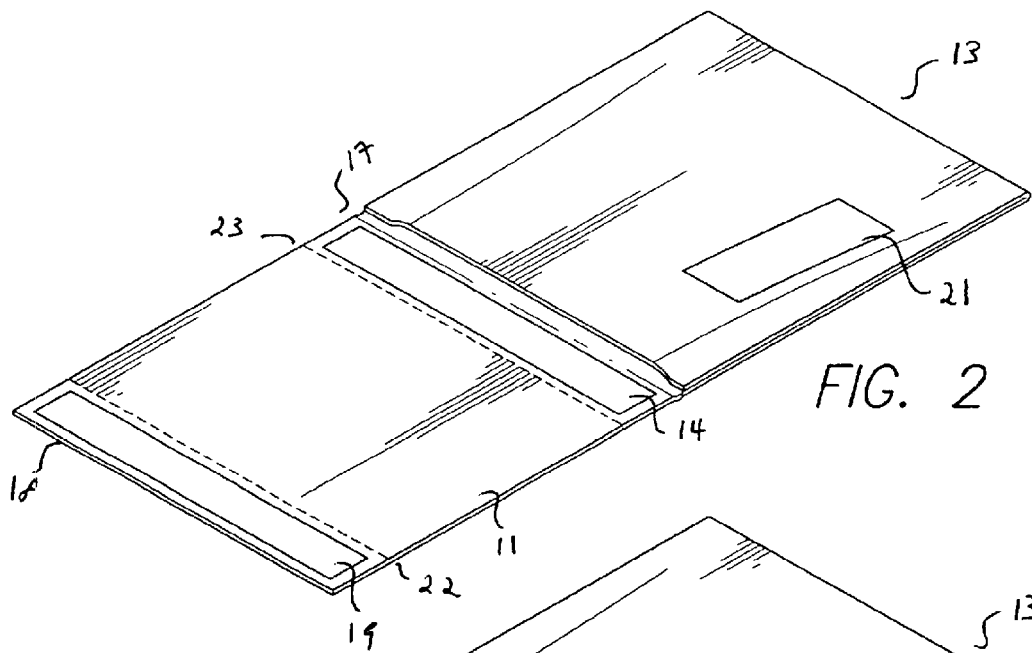
FIG. 2 is an illustration of the packaging system of FIG. 1 in an open configuration.
Figure 3:
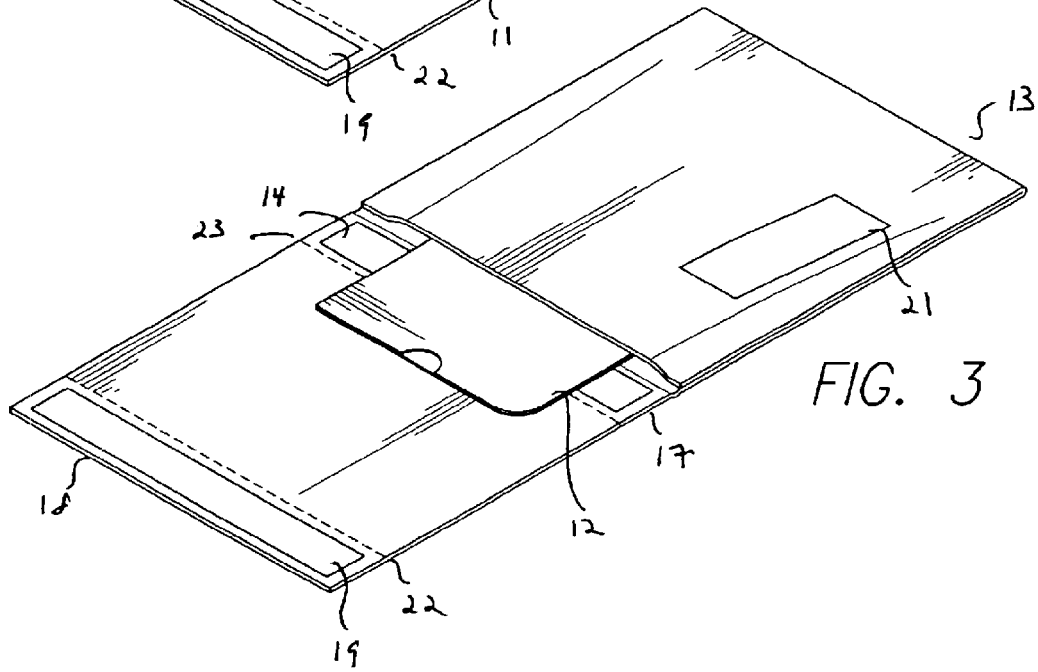
FIG. 3 is a further illustration of the packaging system of FIG. 1 in an open configuration.
Figure 4:
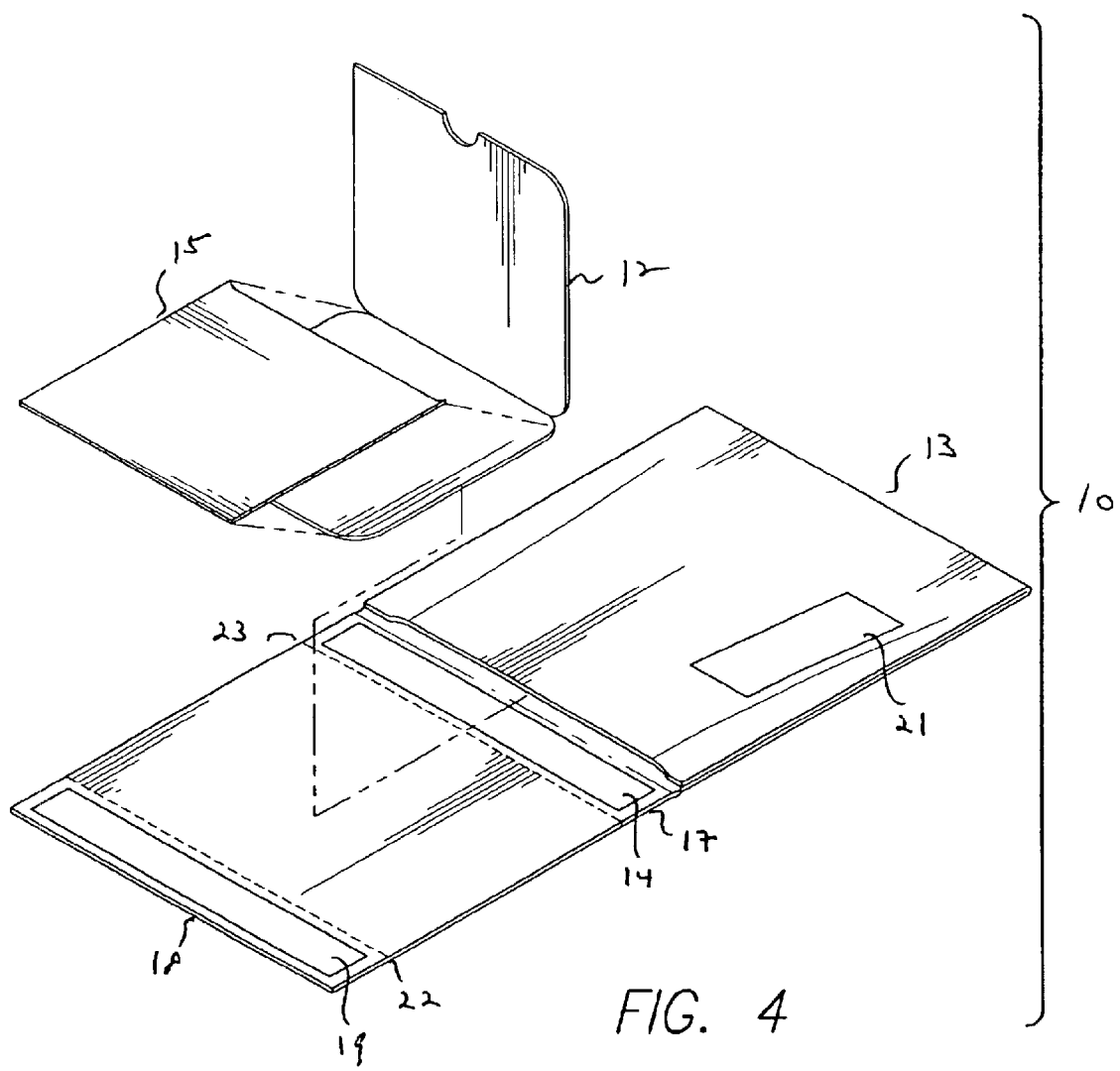
FIG. 4 is a detailed illustration of the elemental components of the packaging system of FIG. 1.
Figure 5:
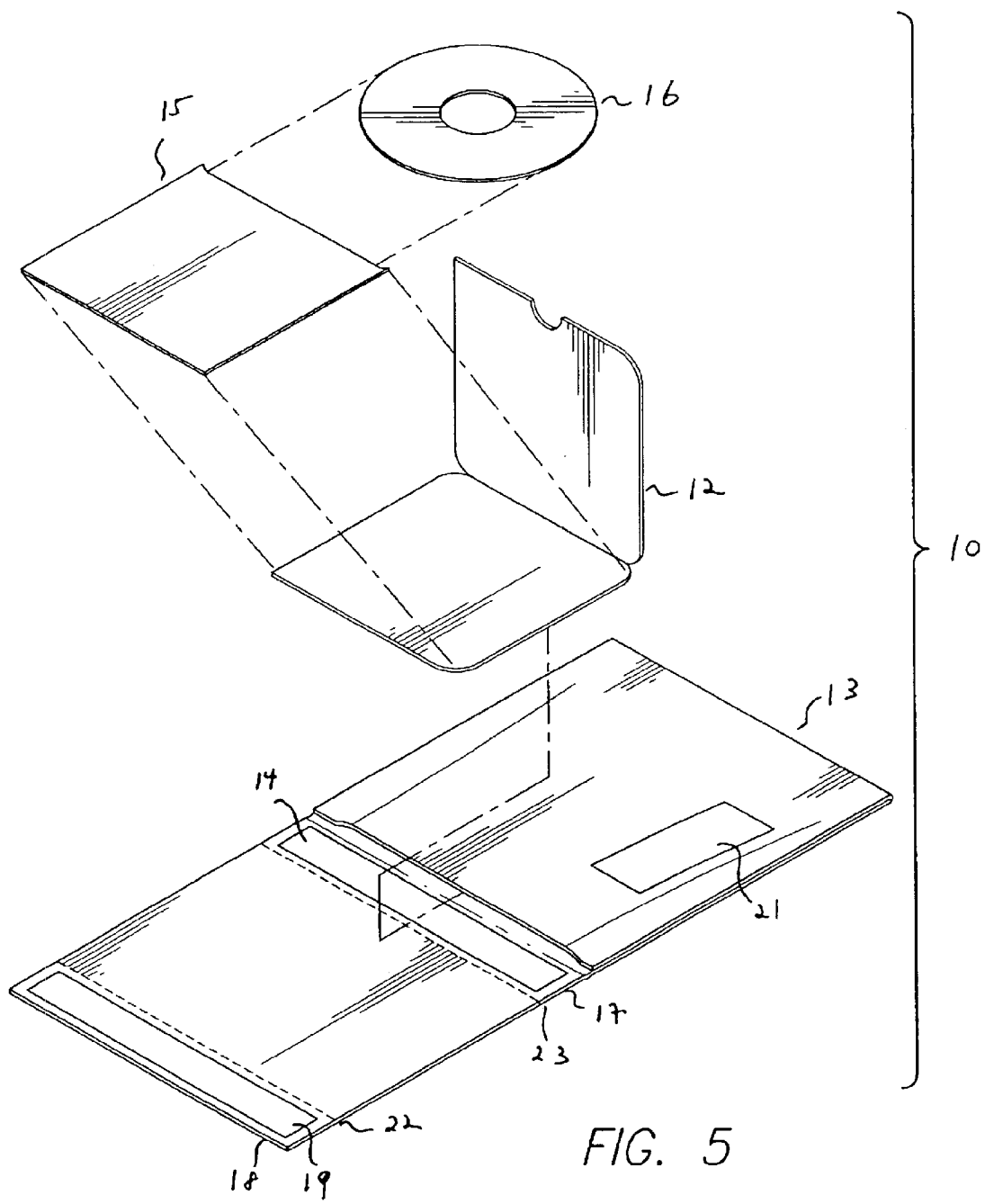
FIG. 5 is yet another detailed illustration of the elemental components of the packaging system of FIG. 1.

FIG. 5 illustrates a detailed view of a packaging system 10 for protecting and transporting digital media 16, which can be a compact disk, DVD, video console disc, etc. The packaging system 10 includes an envelope 13 with a detachable lid 11, an inner pocket 15 into which the digital media 16 may be inserted, and a protective jacket 12 in between which the inner pocket 15 may be inserted. The protective jacket 12 is then inserted into an opening of the envelope 13, which may then be sealed by closing the lid 11. FIG. 1 shows the package system 10 in a sealed condition ready to be transported, while FIGS. 2–4 further illustrate each stage of preparing the digital media for transport using the packaging system 10. Specifically, after the digital media is inserted into the inner pocket 15 as shown in FIG. 5, the inner pocket 15 is then inserted between the folds of the protective jacket 12 as shown in FIG. 4. The protective jacket 12 is then inserted into an opening of the envelope 13 as shown in FIGS. 3 and 2, after which the wax strip 19 is removed to expose the adhesive strip 18 located on the end of lid 11, which is then folded over the perforated edge 22 to seal the envelope 13. An address mailing label 20 may be affixed to the outer surface of lid 11 for mailing the digital media to the designated receiver or consumer.

In accordance with the preferred embodiment, the envelope 13 is preferably made of light weight paper having a weight no more than 75 grams per meter squared in order to lighten the total weight of the package system 1. Also in accordance with the preferred embodiment, inner pocket 15 is preferably made of non-abrasive material such as lightweight, high-density, polyethylene fibers so as to provide durable protection of the surface of the digital media 16. One such example of high-density polyethylene fiber is made by DuPont under the brand name Tyvek®. Finally, the protective jacket 12 is preferably made of light-weight but rigid and reinforced material such as cardboard or plastic so as to provide structural support to the digital media inserted therein.

Figure 6:
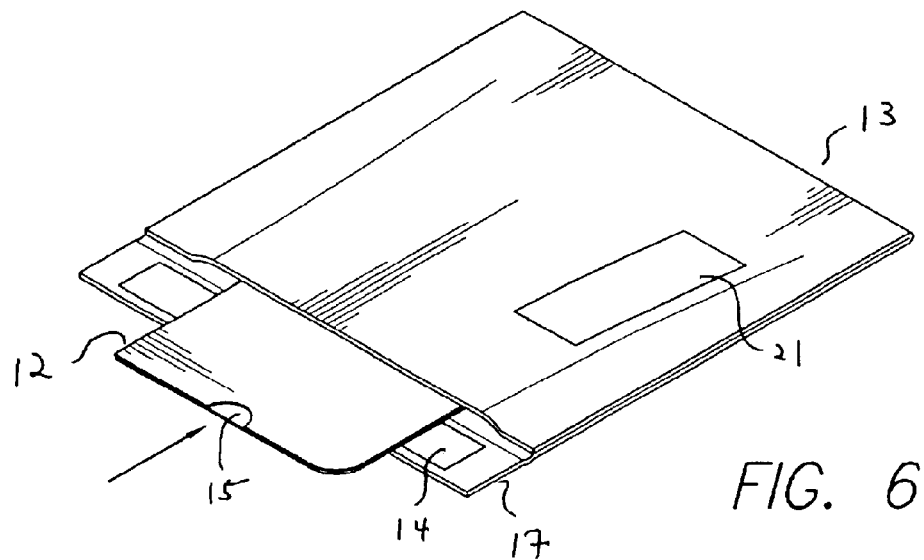
FIG. 6 is an illustration of the packaging system of FIG. 1 with the detachable lid removed.
Figure 7:
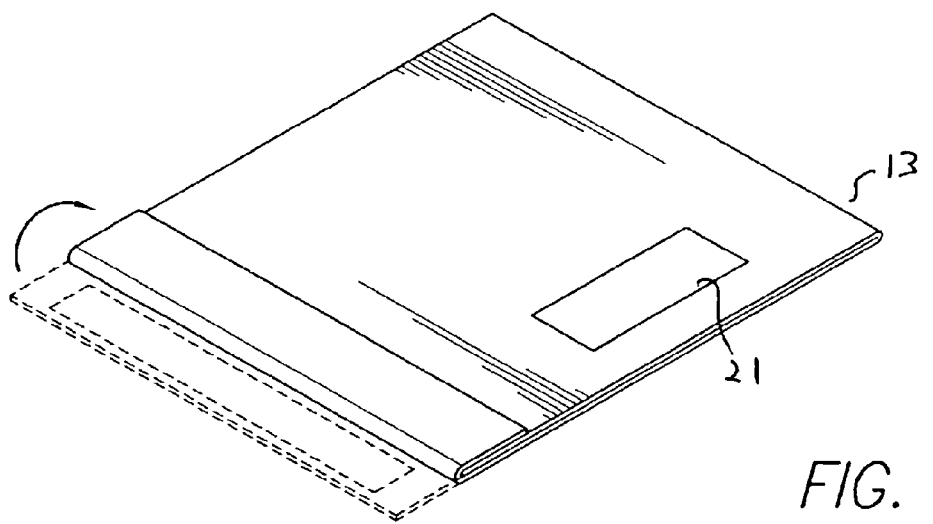
FIG. 7 is another illustration of the packaging system of FIG. 6.

In the case of digital media rentals, the digital media 16 may need to be returned to the vendor after the consumer is done using the digital media. FIGS. 6 and 7 show envelope 13 after the lid 11 is detached at the perforated edge 23. The protective jacket 12 containing inner pocket 15 and the digital media 16 is re-inserted into envelope 13 and sealed with flap 17 for re-transporting the digital media 16 back to the vendor. The flap 17 preferably includes an adhesive layer that is protected by a wax strip 14, which should be peeled off prior to sealing the envelope 13 with the flap 17. A return address mailing label 21 is preferably affixed to the surface of envelope 13 that was previously covered by lid 11 prior to opening of the packaging system 10.

Upon receiving the returned digital media, the vendor can reuse at least the inner pocket 15 and the protective jacket 12 for future transport of the digital media. The ability to reuse the inner pocket 15 and the protective jacket promotes environmental friendly recycling while keeping down the cost of reordering packaging material.

In an alternative embodiment, the packaging system 10 eliminates the use of the inner pocket 15. Instead, the inner surface of the protective jacket 12 is either coated or made with non-abrasive material or surface similar to that of high-density polyethylene fibers so as to prevent the digital media from being scratched during handling and transport.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A system for transporting digital media, said system comprising:
    an inner pocket having an opening into which a digital media can be inserted; and
    an envelope having a front and a back side, said envelope having an opening into which said inner pocket can be inserted, and a sealing portion for sealing the inner pocket within said envelope, said sealing portion having a detachable portion and a reseat portion,
    wherein the front side of the envelope displays a mailing address,
    wherein said detachable portion covers the mailing address on front side of the envelope,
    wherein the envelope can be unsealed by detaching the detachable portion of said sealing portion, revealing the mailing address, and
    wherein the enveloped can be resealed using the reseal portion of the sealing portion after the detachable portion of said sealing portion is detached.

2. The system of claim 1, further comprising a jacket into which said inner pocket can be inserted, said jacket insertable into the opening of said envelope, said jacket being made of reinforced material.

3. The system of claim 1, wherein said inner pocket is made of high-density polyethylene fibers material.

4. The system of claim 1, wherein said digital media is a DVD.

5. The system of claim 1, wherein the envelope is made of light-weight paper having paper weight less than 75 g/m².

6. The system of claim 2, wherein the reinforced material is one of cardboard or plastic.

7. The system of claim 2, wherein the reseal portion of the sealing portion is a foldable flap joining the opening of the envelope along one edge, and joining the detachable portion of the sealing portion along another edge.

8. The system of claim 1, wherein the inner surface of the reseal portion of the sealing portion is coated with an adhesive.

9. A system for transporting digital media, said system comprising:
    a foldable jacket into which said digital media can be inserted;
    an envelope having a front and a back side, said envelope having an opening into which said foldable jacket can be inserted, and a sealing portion for sealing the foldable jacket within said envelope, said sealing portion having a detachable portion and a reseal portion,
    wherein the front side of the envelope displays a mailing address,
    wherein said detachable portion covers the mailing address on front side of the envelope,
    wherein the envelope can be unsealed by detaching the detachable portion of said sealing portion, revealing the mailing address, and
    wherein the enveloped can be resealed using the reseal portion of the sealing portion after the detachable portion of said sealing portion is detached
    wherein said foldable jacket is made of reinforced material, and
    wherein the inner surface of said foldable jacket has a non-abrasive texture.

10. The system of claim 9, wherein the envelope is made of light-weight paper having paper weight less than 75 g/m².

11. The system of claim 9, wherein the reinforced material is one of cardboard or plastic.

12. The system of claim 9, wherein the reseal portion of the sealing portion is a foldable flap joining the opening of the envelope along one edge, and joining the detachable portion of the sealing portion along another edge.

13. The system of claim 9, wherein the inner surface of the reseal portion of the sealing portion is coated with an adhesive.

14. The system of claim 1 or 9, wherein a second mailing address is displayed on the detachable portion such that, before the detachable portion is removed, only the second mailing address is displayed.

* * * * *